Dec. 26, 1944.  E. R. JACOBI  2,366,111
BRAKE
Filed June 14, 1943  3 Sheets-Sheet 1

INVENTOR.
EMIL R. JACOBI
BY
ATTORNEYS

Dec. 26, 1944.    E. R. JACOBI    2,366,111
BRAKE
Filed June 14, 1943    3 Sheets-Sheet 2

INVENTOR.
EMIL R. JACOBI
BY
ATTORNEYS

Dec. 26, 1944.  E. R. JACOBI  2,366,111
BRAKE
Filed June 14, 1943  3 Sheets-Sheet 3

INVENTOR.
EMIL R. JACOBI
BY
ATTORNEYS

Patented Dec. 26, 1944

2,366,111

UNITED STATES PATENT OFFICE 2,366,111

BRAKE

Emil R. Jacobi, Detroit, Mich., assignor to Kelsey-Hayes Wheel Company, Detroit, Mich., a corporation of Delaware Application June 14, 1943, Serial No. 490,800

8 Claims. (Cl. 188—78)

The invention relates to brakes and refers more particularly to brakes of that type having a brake drum and brake members engageable with the drum.

The invention has for one of its objects to provide an improved brake which is powerful in operation.

The invention has for other objects to provide an improved brake in which a brake member when moved against the brake drum exerts a force on another brake member to move the latter against the brake drum; to provide an improved brake in which the torque of a brake member when against the brake drum is utilized by converting the torque into a force to move another brake member against the brake drum; and to provide an improved brake in which all of the brake members are operable to increase the force for applying the brake by increasing the pressure exerted upon the brake members moving the same against the brake drum.

The invention has for further objects to provide an improved brake comprising brake members movable against the brake drum by thrust devices and in turn acting through the thrust devices to increase the force for applying the brake members against the brake drum; and to provide an improved brake employing transversely split rings for applying the brake members against the brake drum and utilizing the torque of the brake members to increase the force of application.

With these and other objects in view, the invention resides in the novel features of construction and combinations and arrangements of parts as more fully hereinafter set forth.

In the drawings:

Figure 1 is a side elevation, with parts broken away, of a brake embodying the invention;

Figures 2 and 3 are cross sections on the lines 2—2 and 3—3, respectively, of Figure 1;

Figure 4 is an enlarged section of a portion of Figure 1;

Figures 5 and 6 are cross sections on the lines 5—5 and 6—6, respectively, of Figure 4;

Figures 1, 3:
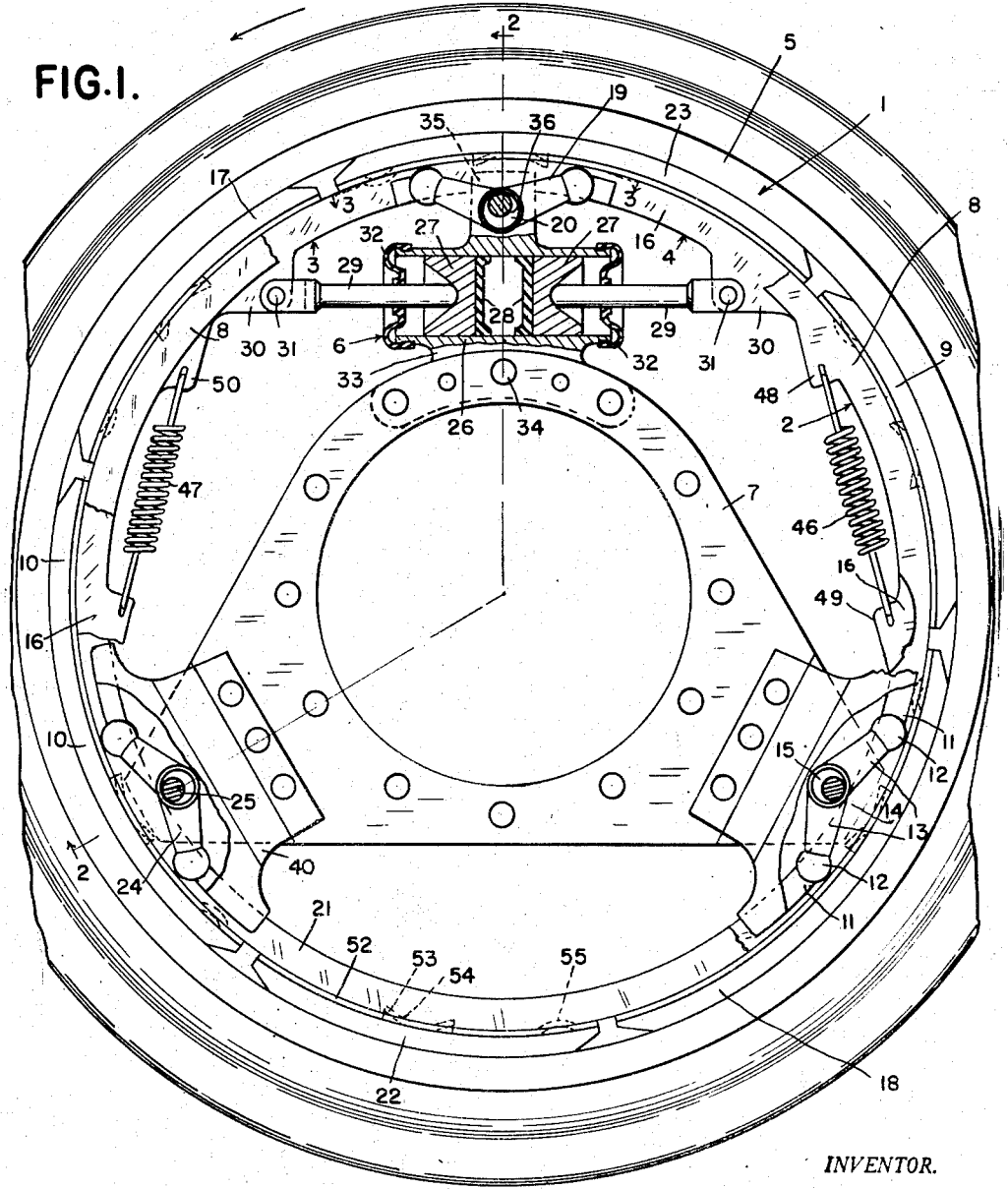
Figure 2:
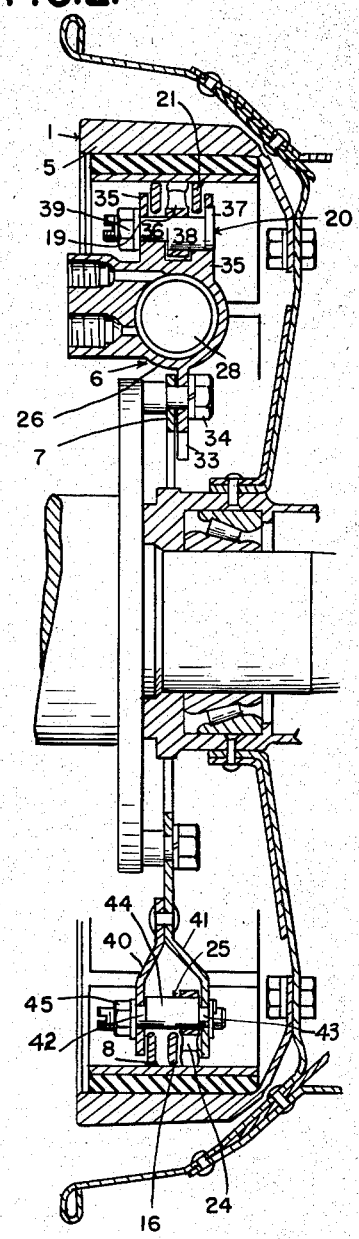

The brake, as illustrated in Figures 1 to 9, inclusive, comprises the brake drum 1 adapted to be secured to a wheel of a motor vehicle, airplane, or the like, the internal brake elements 2, 3 and 4 within the annular brake flange 5 of the brake drum, the actuator 6, and the carrier plate 7 supporting the brake elements and the actuator.

The brake element 2 comprises an expansible thrust device, which is formed of the ring 8, and the pair of diametrically opposite brake members 9 and 10 radially outwardly of the ring and connected thereto. The ring is a transversely split resilient ring having the separable ends 11 which are movable away from and toward each other. The ends are preferably made concave to engage the convex ends 12 of the integral arms 13 of the bell crank anchor 14 which is adjustably pivotally mounted upon the carrier plate 7 by means of the eccentric 15. The brake element 3 is very similar to the brake element 2 in that the brake element 3 comprises an expansible thrust device, formed of the transversely split resilient ring 16, and the pair of diametrically opposite brake members 17 and 18 radially outwardly of and connected to the ring. The ends of the ring 16 are also formed in the same manner as the ends of the ring 8 to receive the convex ends of the bell crank anchor 19 adjustably pivotally mounted upon the carrier plate 7 by the eccentric 20. The brake element 4 is also very similar in that it comprises an expansible thrust device, formed of the transversely split resilient ring 21, and the pair of diametrically opposite brake members 22 and 23 radially outwardly of and connected to the ring. The ends of the ring are also formed in the same manner to receive the convex ends of the bell crank anchor 24 which is adjustably pivotally mounted upon the carrier plate 7 by the eccentric 25. The rings 8, 16 and 21 extend substantially parallel to each other in their assembled relation and the gaps between their ends are angularly spaced at substantially equal distances from each other. The brake members 9, 17 and 22 are located at the leading ends of the rings 8, 16 and 21, respectively, with the brake drum 1 rotating in the direction indicated by the arrow in Figure 1. All of the brake members are arranged in end to end relation and are engageable with the same zone of the brake flange 5 of the brake drum and their lengths are such that their ends extend adjacent to but are spaced from each other so that when the brake is applied the brake members engage the brake flange throughout nearly its circumferential extent. Also, all of the brake members encircle the rings with the radially outer edges of the rings located closely adjacent to and preferably in contact with all of the brake members when the brake elements are in retracted position.

The actuator 6 for applying the brake is a fluid pressure operated actuator or wheel cylinder mounted upon the carrier plate 7 radially inside the bell crank anchor 19 and the eccentric 20. The actuator or wheel cylinder comprises the cylinder 26, the opposed pistons 27 slidable within the cylinder, the opposed sealing cups 28 abutting the pressure ends of the pistons and the piston rods 29 which extend from the pistons to the ring 16 near its ends. As shown, the piston rods have rounded inner ends engaging the pistons and bifurcated outer ends pivotally connected to the projections 30 of the ring by the pivot pins 31. The projections extend generally radially inwardly from the ring near its ends. 32 are flexible seals at the ends of the cylinder 26 and sleeved on the piston rods 30. As shown, the cylinder 26 is formed with the integral radially inwardly extending bracket 33 which is fixedly secured to the carrier plate 7 as by rivets. The carrier plate is mounted upon the support for the wheel and secured thereto by suitable means, such as the bolts 34, certain of which preferably extend through the bracket 33.

The cylinder 26 is preferably formed with the integral radially outwardly extending furcations 35 in which are journaled the concentric shank 36 and head 37 of the eccentric 20 which has the eccentric portion 38 between the shank and the head on which is journaled the bell crank anchor 19. For securing the eccentric in its various positions of rotative adjustment, I have provided the nut 39 threaded upon the shank 36 and adapted to clamp the eccentric portion 38 against the furcation 35 located between the eccentric portion and the nut.

The mounting for each of the eccentrics 15 and 25 is the same, it comprising a plate or bracket 40 and an axially offset portion 41 of the carrier plate 7. Each eccentric has at its ends the shanks 42 and 43, respectively, journaled in the plate or bracket 40 and the offset carrier plate portion 41. Each eccentric has between the shank portions the eccentric portion 44, one end of which is adapted to be clamped against the plate or bracket 40 by the nut 45 threaded upon the shank 42 to hold the eccentric in its various positions of rotative adjustment. The plate or bracket is suitably fixedly secured to the carrier plate 7 as by being riveted thereto after the eccentric has been put in place.

For retracting and also holding the brake elements in their retracted position, I have provided the coil springs 46 and 47. The coil spring 46 is hooked at its upper end to the projection 48 of the ring 8 and at its lower end to the projection 49 of the ring 16 to resiliently urge the leading end of the ring 8 toward its bell crank anchor 14 and the trailing end of the ring 16 toward its bell crank anchor 19. The coil spring 47 is hooked at its upper end to the projection 50 upon the ring 21 and at its lower end to the projection 51 upon the ring 16. As a result, this spring resiliently urges the trailing end of the ring 21 against its bell crank anchor 24 and the leading end of the ring 16 toward its bell crank anchor 19. The projections 48, 49, 50 and 51 are integral with and extend generally radially inwardly from their respective rings.

Figure 5:
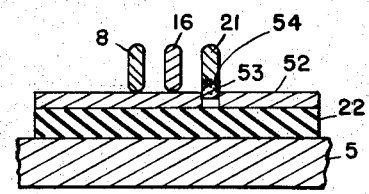
Figure 6:
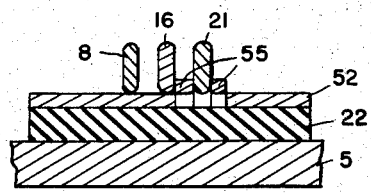
Figure 4:
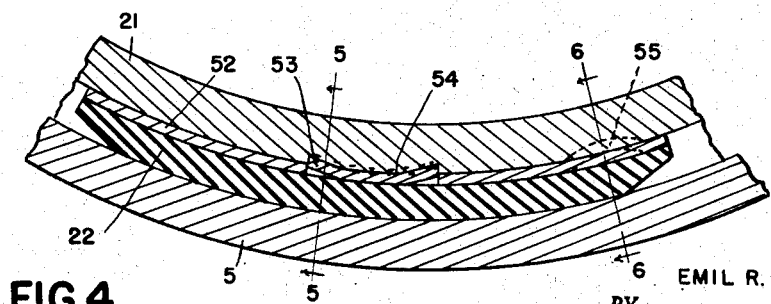

Each of the brake members is secured to its respective ring in the same manner and, as shown particularly in Figures 4, 5 and 6, the arcuate plate 52 of each brake member has struck out therefrom the integral lugs 53 which extend into the recesses 54 in the outer edge of the ring to which the brake member is secured. The lugs are preferably secured to the ring as by being welded. The arcuate plate 52 is also provided with the spaced projections 55 which extend at opposite sides of the ring to which the brake member is secured and these projections serve to properly guide the brake member with respect to its ring.

In operation it will be seen that when braking fluid is forced into the actuator or wheel cylinder 6 and its pistons 27 are relatively moved away from each other, the ends of the ring 16 are spread apart and the ring is expanded to force its brake members 17 and 18 against the brake flange 5 of the brake drum. At the same time the ring 16 forces the brake members 9 and 10 of the ring 8 and the brake members 22 and 23 of the ring 21 against the brake flange. The torque of the brake members 17 and 18 upon engagement thereof with the brake flange is converted into an expanding force for the ring 16 to increase the pressure of the ring on the brake members 9, 10, 22 and 23 and more firmly force these brake members against the brake flange. In the same manner, the torque of the brake members 9 and 10 upon engagement thereof with the brake flange is utilized to more firmly force the brake members 17, 18, 22 and 23 against the brake flange. Also, in the same manner the torque of the brake members 22 and 23 upon engagement thereof with the brake flange is utilized to more firmly force the brake members 9, 10, 17 and 18 against the brake flange. At this time the trailing ends of the devices or rings engage their respective anchors and the leading ends occupy advanced positions. Inasmuch as the gap between the ends of each ring is bridged by two rings an expanding force for each ring is carried over or across its gap so that the brake is very powerful in operation. When the pressure exerted by the braking fluid is released, the coil springs 46 and 47 return the brake elements 2, 3 and 4 and the movable parts of the actuator 6 to their normal retracted positions with both ends of each ring 8, 16 and 21 against their respective anchors. By reason of the encircling brake members and the relative angular positions of the anchors, the brake elements are centered in the brake drum.

Figure 10:
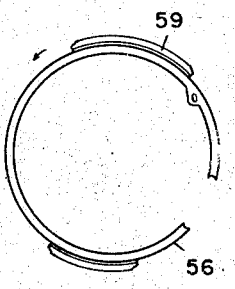
Figures 10, 11 and 12 are views similar to Figures 7, 8 and 9, respectively, of modified brake elements engageable with the brake drum.
Figure 11:
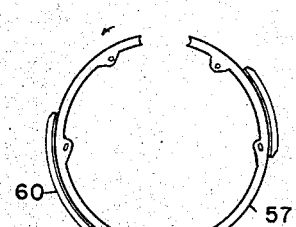
Figure 12:
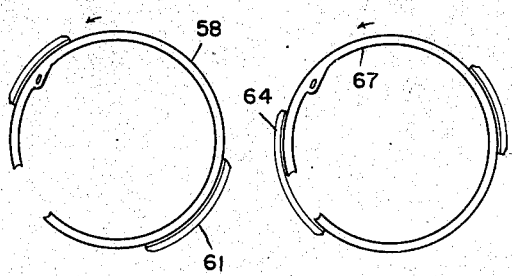
Figure 7:
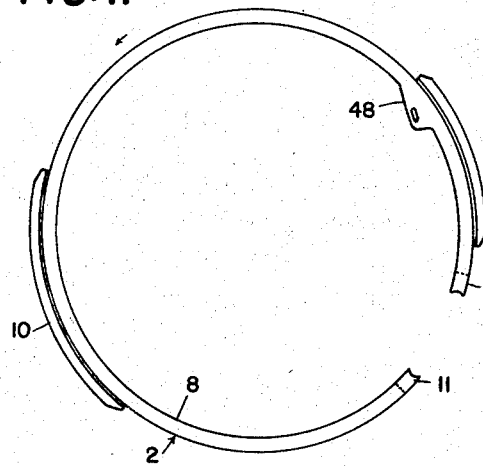
Figures 7, 8 and 9 are side elevations of the brake elements engageable with the brake drum.
Figure 8:
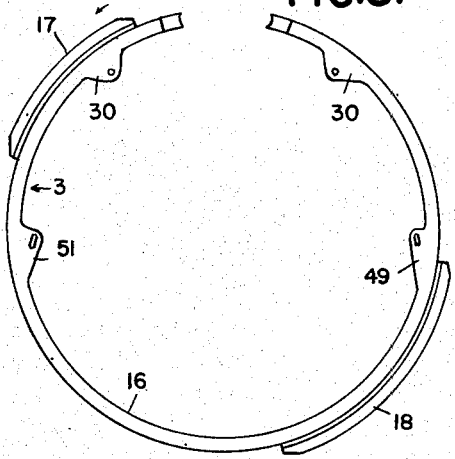
Figure 9:
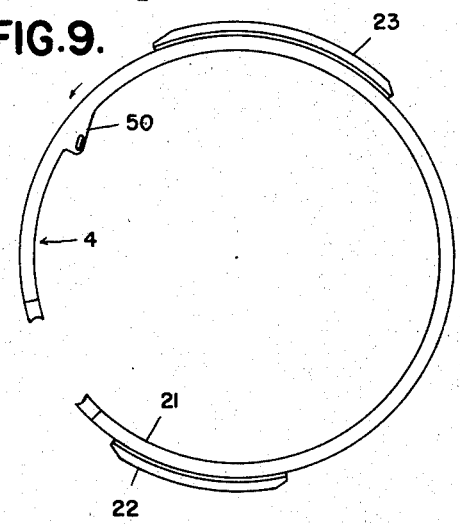

The brake elements 56, 57 and 58, shown respectively in Figures 10, 11 and 12, in general are quite similar to the brake elements 2, 3 and 4 of Figures 7, 8 and 9, respectively. They differ mainly in the locations of the brake members, it being noted that the pairs of diametrically opposite brake members on each ring occupy different positions angularly relative to the ring ends. More in detail, the leading brake members 59, 60 and 61 of the brake elements 56, 57 and 58, respectively, are located at greater angular distances from the leading ends of the rings of the brake elements.

Figure 13:
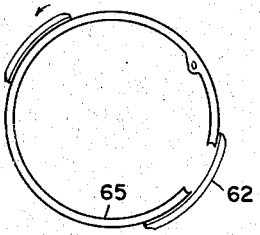
Figures 13, 14 and 15 are views similar to Figures 7, 8 and 9, respectively, of other modified brake elements engageable with the brake drum.
Figure 14:
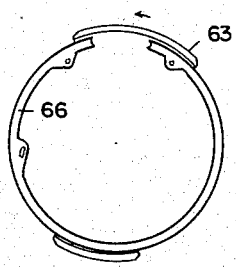
Figure 15:
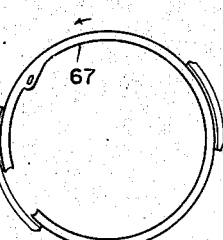

As shown in Figures 13, 14 and 15, the main difference in construction is that the leading brake members 62, 63 and 64 on the rings 65, 66 and 67, respectively, extend over the gaps between the ends of their respective rings and are fixedly secured as by welding to the leading ends of the rings, the trailing ends of the rings being radially inside and slidably engaging the brake members.

What I claim as my invention is:

1. A brake comprising a brake drum, devices having ends relatively movable in opposite directions away from and toward each other, the ends of one of said devices being angularly spaced from the ends of another of said devices, means for relatively moving the ends of one of said devices in one of said opposite directions, and brake members movable against said drum by each of said devices separately from the other of said devices, said brake members being connected to said devices to convert their torque when against said drum into a force for relatively moving the ends of said devices in said last mentioned direction.

2. A brake comprising a brake drum, expansible devices having separable ends with the separable ends of each of said devices angularly spaced from the separable ends of another of said devices, means for relatively moving the ends of one of said devices away from each other to expand said last mentioned device, and brake members movable by said last mentioned device against said drum separately from the other of said devices, certain of said brake members being connected to certain other of said devices to utilize their torque when against said drum as an expanding force for said last mentioned devices.

3. A brake comprising a brake drum, a carrier plate, substantially parallel transversely split rings having the gaps between their ends angularly spaced, anchors on said carrier plate for said rings at an end of each, means carried by said carrier plate for relatively moving the ends of one of said rings away from each other to expand said last mentioned ring, and internal brake members encircling said rings and movable against said drum directly by said last mentioned ring, certain of said brake members being directly connected to certain of said rings to convert their torque when against said drum into an expanding force for said rings.

4. A brake comprising a brake drum, expansible transversely split rings extending substantially parallel to each other with each ring extending past the ends of another ring, an anchor for an end of each ring, brake members between said rings and drum and movable by each of said rings against said drum separately from the other of said ring, certain of said brake members being connected to one ring and certain other of said brake members being connected to another ring, and an actuator for expanding one of said rings.

5. A brake comprising a brake drum, expansible devices having separable ends with the separable ends of each of said devices angularly spaced from the separable ends of the other of said devices, anchors for said devices, brake members extending between said drum and devices and comprising a brake member secured to each of said devices, each brake member being movable against said drum by the device to which it is secured separately from the other devices and being movable against said drum by each of the other devices separately from the device to which it is secured, each brake member utilizing its torque when against said drum as an expanding force for its respective device to increase the pressure upon the other of said brake members urging the same against said drum, and means for separating the ends of one of said devices to expand the latter.

6. A brake comprising a brake drum, expansible devices within said drum, anchors for said devices, brake members extending between said drum and said devices and comprising a brake member secured to each of said devices, each brake member being movable against said drum by each of said devices separately from the device to which it is secured, each brake member utilizing its torque when against said drum as an expanding force for the device to which it is secured to increase the pressure upon the other of said brake members urging the same against said drum, and means for expanding one of said devices.

7. A brake comprising a brake drum, an expansible device, expansible devices at the opposite sides of said first mentioned device, said devices having angularly spaced separable ends whereby a plurality of devices extend past the ends of each device, anchors at the ends of said devices, brake members extending between said drum and devices and comprising a brake member secured to each of said devices, each brake member being movable against said drum by the device to which it is secured separately from the other devices and being movable against said drum by the other devices separately from the device to which it is secured, each brake member utilizing its torque when against said drum as an expanding force for its respective device to increase the pressure upon the other of said brake members urging the same against said drum, and means for separating the ends of one of said devices to expand the latter.

8. A brake comprising a brake drum, substantially parallel rings having separable ends with the separable ends of each ring angularly spaced from the separable ends of the other rings, a pair of substantially diametrically opposite brake members radially outwardly of and connected to each ring, all of said brake members being movable against said drum by each of said rings separately from the other of said rings, each pair of brake members when against said drum exerting a force for expanding the ring to which the brake members are connected, and means for expanding one ring.

EMIL R. JACOBI.